April 26, 1927.

H. RÖWER ET AL

ATTACHMENT FOR PLOWS

Filed Dec. 22, 1926

1,626,358

Inventors
Heinrich Röwer
Fritz Röwer

Paul E. Schilling
Attorney

Patented Apr. 26, 1927.

1,626,358

UNITED STATES PATENT OFFICE.

HEINRICH RÖWER AND FRITZ RÖWER, OF BLENDER, GERMANY.

ATTACHMENT FOR PLOWS.

Application filed December 22, 1926, Serial No. 156,326, and in Germany December 21, 1925.

This invention relates to a coulter and supplemental moldboard attachment for plows. In plows of this construction the coulter is either fixed on the plow-beam or directly on the plow-body, and in the latter case it generally has the shape of a plate or of a knife forwardly projecting and extending from a horizontal arm. These plows of known type present the inconveniences that they get easily clogged and that the earth mixed with manure containing long fibrous material is not intercepted directly in front of the plow and guided so as to be deposited at the side of the furrow.

These inconveniences are avoided, according to the invention, by arranging on the plow body, directly above the point of the plow share, a coulter and a supplemental moldboard constructed and operating as hereinafter described.

An embodiment of the invention is shown, by way of example, in the accompanying drawings, in which.

Figure 1:
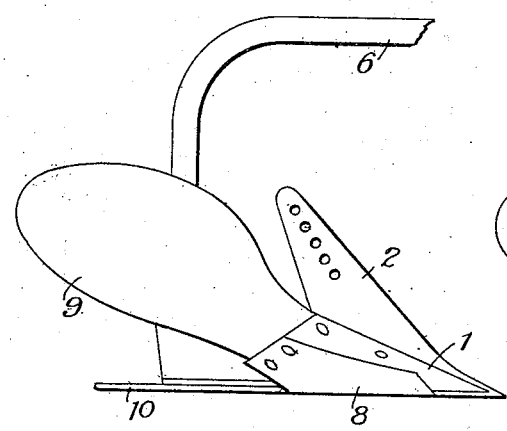
Fig. 1 shows a plow, the supplemental moldboard being removed.
Figure 3:
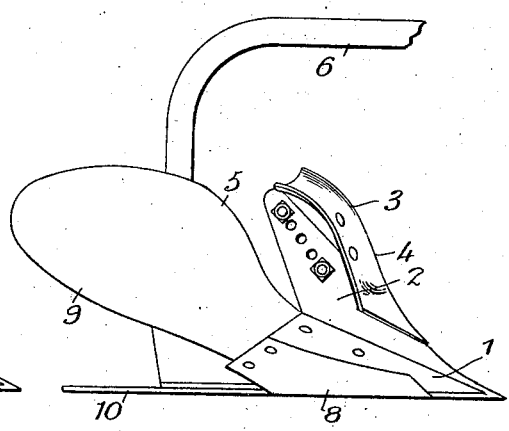
Fig. 3 shows a plow with the supplemental moldboard fixed on the coulter.

Above the point 1 of the plow-share a knife-like coulter blade or plate 2 is arranged which ascends obliquely in rearward direction. This blade or plate 2 serves as a support for a supplemental moldboard 3 spaced at a certain distance from main moldboard 9.

The manure, containing long fibrous material, is intercepted by the coulter blade 2 and guided thereby towards the front edge 4 of the supplemental moldboard 3, which guides it toward the front edge 5 of the main mold board. The manure is guided by the main mold board together with the top layer of earth and deposited at the side into the furrow. The supplemental moldboard 3 which, according to the kind of soil in which the plow is used, is broader or narrower, has above its mold board portion free from connection with the plow beam 6 and spaced therefrom so that a free passage between them for the deposit of earth and manure is created.

Figure 5:
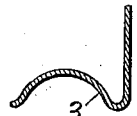
Fig. 5 is a section on line 5—5 of Fig. 4.

As shown in Fig. 5, the supplemental moldboard has a forward share portion and a main body or moldboard portion, which latter is of convex cross section and longitudinally curved in an inward direction or toward the main moldboard and provided with a guide rib or flange 3ª so that lateral movement of heavy constituents of the soil will be prevented. These heavy constituents of the soil slide upwardly along the convex surface of the moldboard portion of the supplemental moldboard, together with the light manure, and drop into the furrow, no separating of the heavy soil from the light manure taking place.

Figure 2:
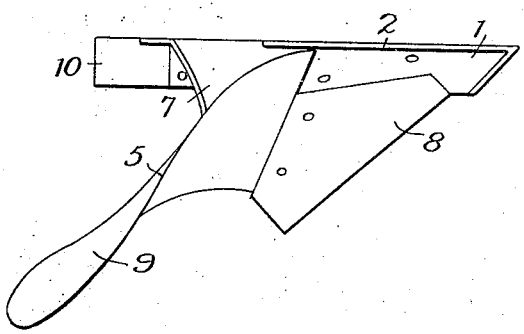
Fig. 2 is a plan view of Fig. 1.
Figure 4:
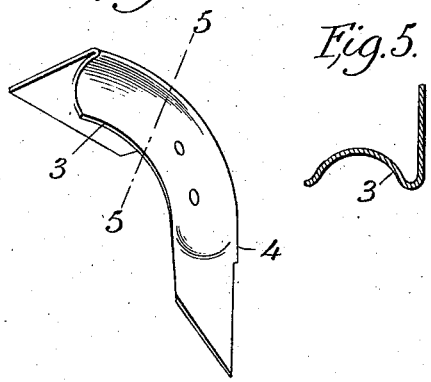
Fig. 4 is a front elevation of the supplemental moldboard.

In order to prevent earth from sticking to the surface of the main moldboard near the runner, the mold board is cut away at the land-side, the front edge 5 of the same being turned inwards from the base and connected to the runner by the frog 7 which is made convex over its entire extent to secure strength and to firmly stay the main moldboard (Fig. 2).

The coulter 2 may, according to the type of the plow, either be made in one piece with the plow-share 8, the mold board 9, the runner 10, the frog 7 or with any other part of the plow, or fixed on one of said parts.

We claim:—

1. An attachment for plows comprising, in combination, a coulter, and a supplemental moldboard mounted on said coulter, said supplemental moldboard having a share portion and a convex moldboard portion.

2. In combination, a plow having a long share portion and a moldboard having a cutaway landside portion, a coulter mounted on said share portion and spaced from said cutaway portion of the moldboard, and a supplemental moldboard mounted upon said coulter, said supplemental moldboard having a share portion and a convex moldboard portion.

In testimony whereof we affix our signatures.

HEINRICH RÖWER.
FRITZ RÖWER.